US012428029B2

United States Patent
Zhao et al.

(10) Patent No.: US 12,428,029 B2
(45) Date of Patent: Sep. 30, 2025

(54) SYSTEMS AND METHODS FOR ESTIMATING CUBOID HEADINGS BASED ON HEADING ESTIMATIONS GENERATED USING DIFFERENT CUBOID DEFINING TECHNIQUES

(71) Applicant: FORD GLOBAL TECHNOLOGIES, LLC, Dearborn, MI (US)

(72) Inventors: Wulue Zhao, Ann Arbor, MI (US); Fnu Ratnesh Kumar, Mountain View, CA (US); Kevin L. Wyffels, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 704 days.

(21) Appl. No.: 17/455,055

(22) Filed: Nov. 16, 2021

(65) Prior Publication Data
US 2023/0150543 A1 May 18, 2023

(51) Int. Cl.
*B60W 60/00* (2020.01)
*B60W 50/06* (2006.01)
(Continued)

(52) U.S. Cl.
CPC ........ *B60W 60/0016* (2020.02); *B60W 50/06* (2013.01); *G01S 17/89* (2013.01); *G01S 17/931* (2020.01); *G06F 18/21* (2023.01); *G06F 18/253* (2023.01); *G06N 20/00* (2019.01); *G06T 7/50* (2017.01); *G06T 7/62* (2017.01);
(Continued)

(58) Field of Classification Search
CPC ............. B60W 60/0016; B60W 50/06; B60W 2420/408; G01S 17/89; G01S 17/931; G06F 18/253; G06N 20/00; G06T 7/50; G06T 7/62; G06T 7/73; G06T 2207/20081; G06T 2207/20084; G06T 2207/30241;
(Continued)

(56) References Cited

U.S. PATENT DOCUMENTS 11,010,907 B1 * 5/2021 Bagwell ............... G05D 1/0221
2018/0137642 A1 5/2018 Malisiewicz et al.
(Continued)

OTHER PUBLICATIONS

Sanatkar, M., Lidar 3d Object Detection Methods, Towards Data Science, Jun. 1, 2020.
(Continued)

*Primary Examiner* — Anne Marie Antonucci
*Assistant Examiner* — Jodi Jones
(74) *Attorney, Agent, or Firm* — Frank A. MacKenzie; Brooks Kushman P.C.

(57) ABSTRACT

Disclosed herein are systems, methods, and computer program products for operating a robotic system. For example, the method includes: obtaining a first cuboid generated based on an image, a second cuboid generated based on a lidar dataset and/or a third cuboid generated by a heuristic algorithm using the lidar dataset; using a machine learning model to generate a heading for an object in proximity to the robotic system based on the first cuboid, second cuboid and/or third cuboid; generating a bounding box geometry and a bounding box location based on the second cuboid or third cuboid; and generating a fourth cuboid using the bounding box geometry, the bounding box location, and the heading generated using the machine learning model.

18 Claims, 10 Drawing Sheets

(51) Int. Cl.

| | |
|---|---|
| *G01S 17/89* | (2020.01) |
| *G01S 17/931* | (2020.01) |
| *G06F 18/21* | (2023.01) |
| *G06F 18/25* | (2023.01) |
| *G06N 20/00* | (2019.01) |
| *G06T 7/50* | (2017.01) |
| *G06T 7/62* | (2017.01) |
| *G06T 7/73* | (2017.01) |
| *G06V 20/10* | (2022.01) |
| *G06V 20/56* | (2022.01) |

(52) U.S. Cl.
CPC ............... *G06T 7/73* (2017.01); *G06V 20/10* (2022.01); *G06V 20/588* (2022.01); *B60W 2420/408* (2024.01); *G06T 2207/20081* (2013.01); *G06T 2207/20084* (2013.01); *G06T 2207/30241* (2013.01); *G06T 2207/30256* (2013.01)

(58) Field of Classification Search
CPC .......... G06T 2207/30256; G06V 20/10; G06V 20/588; G06V 10/25; G06V 10/70; G06V 20/58
USPC ....... 701/706, 12, 23, 28, 1, 117, 96, 27, 93, 701/3, 523, 514, 450, 469, 468, 29.1, 701/519, 120, 102, 517, 101, 302, 467, 701/58, 44, 74, 118, 461, 527, 59, 87, 90, 701/112, 30.5, 31.9, 32.2, 32.3, 32.9, 426, 701/438, 482, 484, 52, 60, 75, 76, 79, 8, 701/98, 114, 17, 29.6, 30.3, 32.4, 34.3, 701/40, 425, 43, 451, 534, 537, 77, 110, 701/29.7, 31.1, 31.5, 421, 422, 458, 494, 701/516, 541, 78, 83, 94, 105, 11, 113, 701/121, 30.8, 31.6, 31.7, 32.1, 32.8, 701, 701/33.7, 416, 455, 459, 487, 511, 524, 701/536, 55, 73, 80, 89, 9, 104, 108, 111, 701/115, 122, 124, 20, 30.4, 30.7, 30.9, 701/32.7, 33.6, 418, 419, 437, 462, 495, 701/498, 526, 540, 56, 481, 531
See application file for complete search history.

(56) References Cited

U.S. PATENT DOCUMENTS

2019/0361106 A1* 11/2019 Stachnik .............. G01S 13/588
2020/0191914 A1* 6/2020 Kunz .................... G01S 7/4802

OTHER PUBLICATIONS

Madan, V. et al., Labeling data for 3D object tracking and sensor fusion in Amazon SageMaker Ground Truth, AWS Machine Learning Blog, Jun. 10, 2020.
Weng, X. et al., Monocular 3D Object Detection with Pseudo-LiDAR Point Cloud, ICCV Workshop.
Choi, H. et al., Multi-View Reprojection Architecture for Orientation Estimation, ICCV Workshop.

* cited by examiner

SYSTEMS AND METHODS FOR ESTIMATING CUBOID HEADINGS BASED ON HEADING ESTIMATIONS GENERATED USING DIFFERENT CUBOID DEFINING TECHNIQUES

BACKGROUND

Statement of the Technical Field

The present disclosure relates generally to robotic systems and object detection operations. More particularly, the present disclosure relates to implementing systems and methods for estimating cuboids headings based on heading estimations generated using different cuboid defining techniques (for example, a 2D image based technique, a 3D light detection and ranging system (lidar) point cloud based technique, an input-wise permutation invariance neural network based technique and/or a heuristic based technique).

Description of the Related Art

Modern day vehicles have at least one on-board computer and have internet/satellite connectivity. The software running on these on-board computers monitor and/or control operations of the vehicles. The vehicle also comprises monocular or stereo cameras and/or lidar detectors for detecting objects in proximity thereto. The cameras capture images of a scene. The lidar detectors generate lidar datasets that measure the distance from the vehicle to an object at a plurality of different times. These images and distance measurements can be used for detecting and tracking movements of the object, making predictions as to the object's trajectory, and planning paths of travel for the vehicle based on the predicted objects trajectory.

SUMMARY

The present disclosure concerns implementing systems and methods for operating a robotic system. The methods comprise performing the following operations by a computing device: obtaining a first cuboid generated based on an image, a second cuboid generated based on a light detection and ranging system (lidar) dataset, and/or a third cuboid generated by a heuristic algorithm using the lidar dataset; using a machine learning model to generate a heading for an object in proximity to the robotic system based on the first cuboid, second cuboid and/or third cuboid; generating a bounding box geometry and a bounding box location based on the second cuboid or third cuboid; generating a fourth cuboid using the bounding box geometry, the bounding box location, and the heading generated using the machine learning model; and/or using the cuboid to cause movement of the robotic system (for example, for object trajectory generation, vehicle trajectory generation, and/or braking/throttle/steering control).

The methods also comprise generating a plurality of features for input into a machine learning algorithm based on at least two of the first cuboid, the second cuboid, the third cuboid and lane geometries. The features can include, but are not limited to, a first heading of the first cuboid, a second heading of the second cuboid, a third heading of the third cuboid, a variance for the first heading, a variance for the second heading, a variance for the third heading, a value indicating an availability of a heading and a heading variance associated with the first cuboid, a value indicating an availability of a heading and a heading variance associated with the second cuboid, a value indicating an availability of a heading and a heading variance associated with the third cuboid, a distance from the robotic system to the first cuboid, a distance from the robotic system to the second cuboid, a distance from the robotic system to the third cuboid, a number of points in the second cuboid or third cuboid, a course of the object, a plurality of lane directions, a value indicating whether the object is in a driving lane, a distance from the object to a driving lane, an area of the object based on a geometry of the third cuboid, a long side length of the object based on the geometry of the third cuboid, a short side length of the object based on the geometry of the third cuboid, and/or a maximum height of the object from a ground surface.

The bounding box geometry and the bounding box location may be generated by: selecting the second cuboid when available for the object; selecting the third cuboid when the second cuboid is not available for the object; and using a geometry of the second or third cuboid which was selected to define a size and location for a bounding box.

The implementing systems can comprise: a processor; and a non-transitory computer-readable storage medium comprising programming instructions that are configured to cause the processor to implement a method for operating an automated system. The above described methods can also be implemented by a computer program product comprising a memory and programming instructions that are configured to cause a processor to perform operations.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
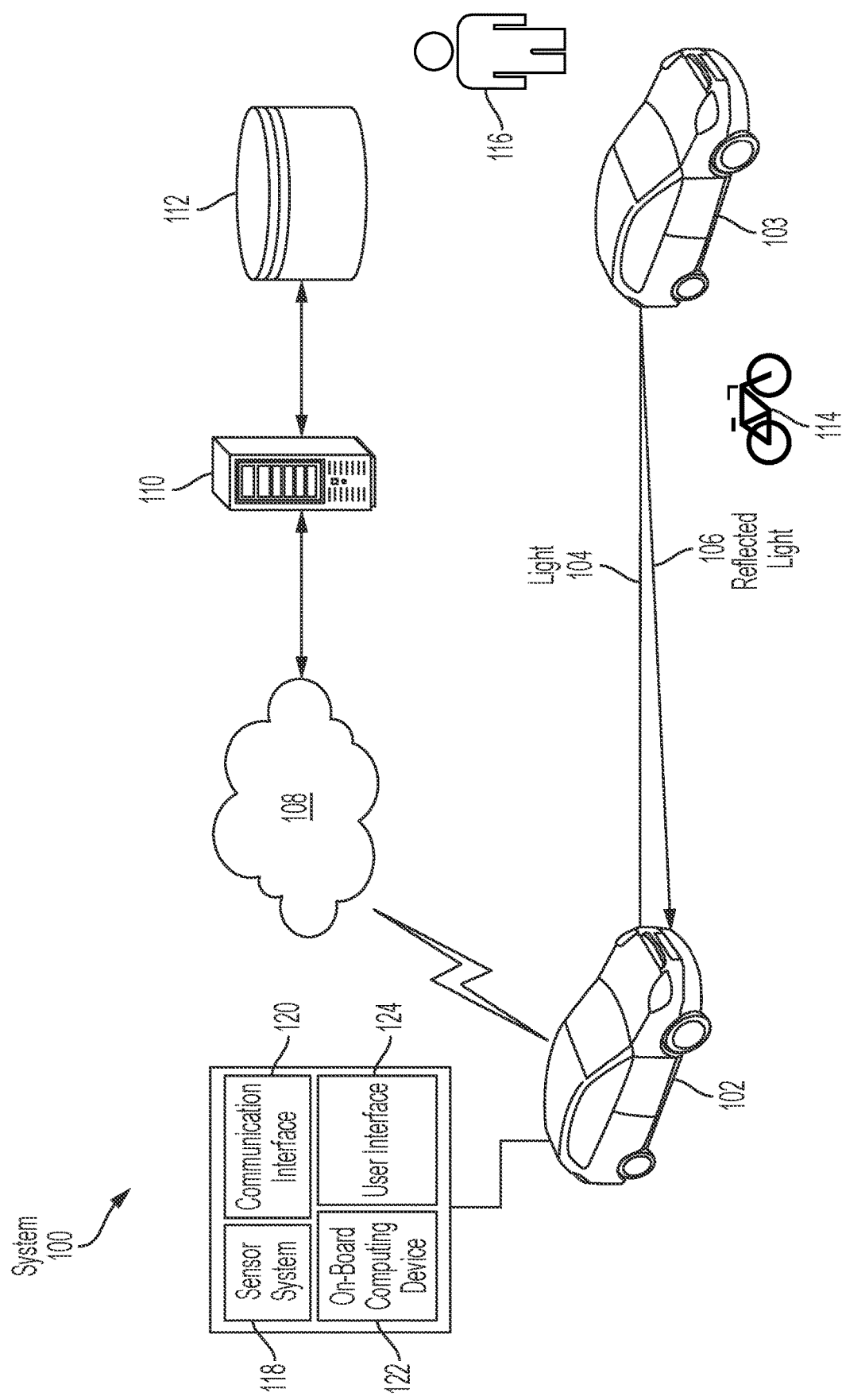
FIG. 1 is an illustration of an illustrative system.

In current autonomous vehicle systems, several approaches are used to estimate cuboids of a detected object (for example, a vehicle). For example, tracking heuristics include a set of heuristics to estimate cuboid geometries and headings. The heuristics are based on classifier detections, and thus can be affected with errors in the classifier detection such as those resulting from under-segmentation issues. The present solution solves these problems.

The present solution comprises systems, apparatus, devices, methods, computer program products, and/or combinations and sub-combinations thereof for generating cuboids and/or operating robotic systems (for example, autonomous vehicles). The methods comprise performing the following operations by a circuit and/or computing device: obtaining a first cuboid generated based on an image, a second cuboid generated based on a light detection and ranging (lidar) dataset, and/or a third cuboid generated by a heuristic algorithm using the lidar dataset; using a machine learning model to generate a heading for an object in proximity to the robotic system based on the first cuboid, second cuboid and/or third cuboid; generating a bounding box geometry and a bounding box location based on the second cuboid or third cuboid; generating a fourth cuboid using the bounding box geometry, the bounding box location, and the heading generated using the machine learning model; and/or using the cuboid to cause movement of the robotic system (for example, for object trajectory generation, vehicle trajectory generation, and/or braking/throttle/steering control).

The methods also comprise generating a plurality of features for input into the machine learning algorithm based on at least two of the first cuboid, the second cuboid, the third cuboid and lane geometries. The features can include, but are not limited to, a first heading of the first cuboid, a second heading of the second cuboid, a third heading of the third cuboid, a variance for the first heading, a variance for the second heading, a variance for the third heading, a value indicating an availability of a heading and a heading variance associated with the first cuboid, a value indicating an availability of a heading and a heading variance associated with the second cuboid, a value indicating an availability of a heading and a heading variance associated with the third cuboid, a distance from the robotic system to the first cuboid, a distance from the robotic system to the second cuboid, a distance from the robotic system to the third cuboid, a number of points in the second cuboid or third cuboid, a course of the object, a plurality of lane directions, a value indicating whether the object is in a driving lane, a distance from the object to a driving lane, an area of the object based on a geometry of the third cuboid, a long side length of the object based on the geometry of the third cuboid, a short side length of the object based on the geometry of the third cuboid, and/or a maximum height of the object from a ground surface.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Notably, the present solution is being described herein in the context of an autonomous vehicle. However, the present solution is not limited to autonomous vehicle applications. The present solution can be used in other applications such as robotic application, radio detection and ranging (RADAR) system application, metric applications, and/or system performance applications. It should be noted that an autonomous vehicle is a mobile platform and/or a robotic system. The present solution can be implemented in other types of mobile platforms and/or robotic systems (for example, articulating arms).

FIG. 1 illustrates an example system 100, in accordance with aspects of the disclosure. System 100 comprises a vehicle 102 that is traveling along a road in a semi-autonomous or autonomous manner. Vehicle 102 is also referred to herein as an AV 102. The AV 102 can include, but is not limited to, land vehicles (as shown in FIG. 1), aircraft, watercraft, subterrenes, spacecraft, drones and/or an articulating arm (for example, with a gripper at a free end). As noted above, except where specifically noted this disclosure is not necessarily limited to AV embodiments, and it may include non-autonomous vehicles in some embodiments.

AV 102 is generally configured to detect objects 103, 114, 116 in proximity thereto. The objects can include, but are not limited to, a vehicle 103, a cyclist 114 (such as a rider of a bicycle, electric scooter, motorcycle, or the like) and/or a pedestrian 116.

As illustrated in FIG. 1, the AV 102 may include a sensor system 118, an on-board computing device 122, a communications interface 120, and a user interface 124. AV 102 may further include certain components (as illustrated, for example, in FIG. 2) included in vehicles, which may be controlled by the on-board computing device 122 using a variety of communication signals and/or commands, such as, for example, acceleration signals or commands, deceleration signals or commands, steering signals or commands, braking signals or commands, etc.

Figure 2:
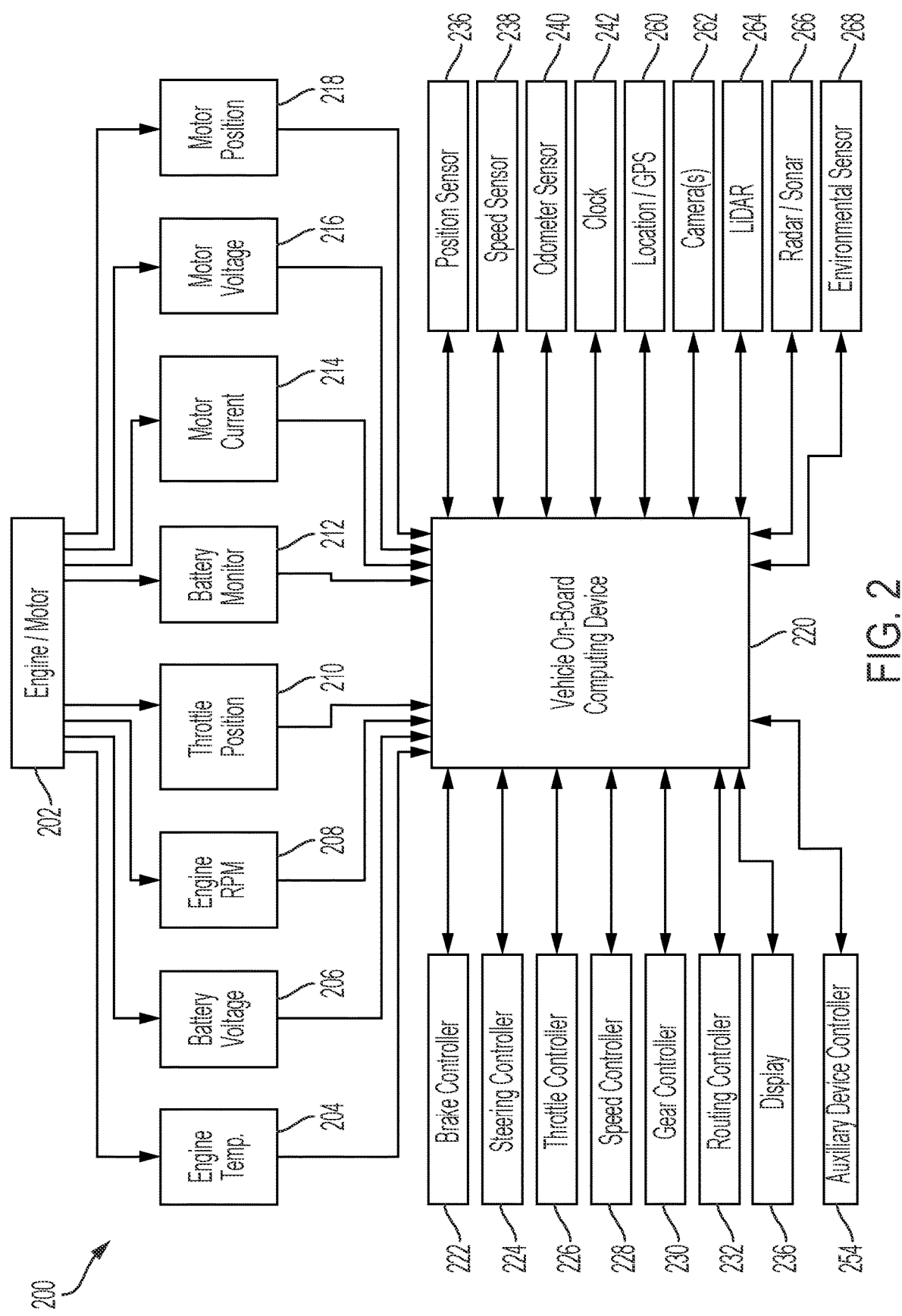
FIG. 2 is an illustration of an illustrative architecture for a vehicle.

The sensor system 118 may include one or more sensors that are coupled to and/or are included within the AV 102, as illustrated in FIG. 2. For example, such sensors may include, without limitation, a lidar system, a RADAR system, a laser detection and ranging (LADAR) system, a sound navigation and ranging (SONAR) system, camera(s) (for example, visible spectrum camera(s), infrared camera(s), etc.), temperature sensors, position sensors (for example, a global positioning system (GPS), etc.), location sensors, fuel sensors, motion sensors (for example, an inertial measurement unit (IMU), etc.), humidity sensors, occupancy sensors, and/or the like. The sensors are generally configured to generate sensor data. The sensor data can include information that describes the location of objects within the surrounding environment of the AV 102, information about the environment itself, information about the motion of the AV 102, information about a route of the vehicle, and/or the like. As AV 102 travels over a surface (for example, a road), at least some of the sensors may collect data pertaining to the surface.

As will be described in greater detail, AV 102 may be configured with a lidar system (for example, lidar system 264 of FIG. 2). The lidar system may be configured to transmit a light pulse 104 to detect objects located within a distance or range of distances of AV 102. Light pulse 104 may be incident on one or more objects (for example, AV 103) and be reflected back to the lidar system. Reflected light pulse 106 incident on the lidar system may be processed to determine a distance of that object to AV 102. The reflected light pulse 106 may be detected using, in some scenarios, a photodetector or array of photodetectors positioned and configured to receive the light reflected back into the lidar system. Lidar information, such as detected object data, is communicated from the lidar system to the on-board computing device 122. The AV 102 may also communicate lidar data to a remote computing device 110 (for example, a cloud processing system) over a network 108. Computing device 110 may be configured with one or more servers to process one or more processes of the technology described herein. Computing device 110 may also be configured to communicate data/instructions to/from AV 102 over network 108, to/from server(s) and/or database(s) 112.

It should be noted that the lidar systems for collecting data pertaining to the surface may be included in systems other than the AV 102 such as, without limitation, other vehicles (autonomous or driven), robots, satellites, etc.

Network 108 may include one or more wired or wireless networks. For example, the network 108 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 108 from the database 112. Database 112 may be configured to store and supply raw data, indexed data, structured data, map data, program instructions or other configurations as is known.

The communications interface 120 may be configured to allow communication between AV 102 and external systems, such as, for example, external devices, sensors, other vehicles, servers, data stores, databases, etc. The communications interface 120 may utilize any now or hereafter known protocols, protection schemes, encodings, formats, packaging, etc. such as, without limitation, Wi-Fi, an infrared link, Bluetooth, etc. The user interface 124 may be part of peripheral devices implemented within the AV 102 including, for example, a keyboard, a touch screen display device, a microphone, and a speaker, etc. The vehicle also may receive state information, descriptive information or other information about devices or objects in its environment via the communication interface 117 over communication links such as those known as vehicle-to-vehicle, vehicle-to-object or other V2X communication links. The term "V2X" refers to a communication between a vehicle and any object that the vehicle may encounter or affect in its environment.

As noted above, the AV 102 may detect objects 103, 114, 116 in proximity thereto. Such object detections are facilitated using the sensor data generated by the sensor system 118 (for example, lidar datasets generated by an onboard lidar detector). The sensor data is processed by the onboard computing device 122 of the AV 102 and/or by the remote computing device 110 to obtain one or more predicted trajectories for the object given the sensor data. The predicted trajectories for the object may then be used to generate a trajectory for the AV 102. The AV 103 may then be caused by the on-board computing device to follow the trajectory.

FIG. 2 illustrates a system architecture 200 for a vehicle, in accordance with aspects of the disclosure. Vehicles 102 and/or 103 of FIG. 1 can have the same or similar system architecture as that shown in FIG. 2. Thus, the following discussion of system architecture 200 is sufficient for understanding vehicle(s) 102, 103 of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, the system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors 218 such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device 220, it may be a separate device, or multiple clocks may be available.

The vehicle also will include various sensors that operate to gather information about the environment in which the vehicle is traveling. These sensors may include, for example: a location sensor 260 (for example, a GPS device); object detection sensors such as one or more cameras 262; a lidar sensor system 264; and/or a RADAR and/or SONAR system 266. The sensors also may include environmental sensors 268 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 220. The vehicle on-board computing device 220 may be implemented using the computer system of FIG. 4. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the vehicle on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors to the vehicle on-board computing device 220. The object detection information and/or captured images are processed by the vehicle on-board computing device 220 to detect objects in proximity to the vehicle. Any known or to be known technique for making an object detection based on sensor data and/or captured images can be used in the embodiments disclosed in this document.

Lidar information is communicated from lidar system 264 to the vehicle on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle. The manner in which the object detections are made by the vehicle on-board computing device 220 includes such capabilities detailed in this disclosure.

In addition, the system architecture 200 may include an onboard display device 236 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 220 may include and/or may be in communication with a routing controller 232 that generates a navigation route from a start position to a destination position for an autonomous vehicle. The routing controller 232 may access a map data store to identify possible routes and road segments that a vehicle can travel on to get from the start position to the destination position. The routing controller 232 may score the possible routes and identify a preferred route to reach the destination. For example, the routing controller 232 may generate a navigation route that minimizes Euclidean distance traveled or other cost function during the route, and may further access the traffic information and/or estimates that can affect an amount of time it will take to travel on a particular route. Depending on implementation, the routing controller 232 may generate one or more routes using various routing methods, such as Dijkstra's algorithm, Bellman-Ford algorithm, or other algorithms. The routing controller 232 may also use the traffic information to generate a navigation route that reflects expected conditions of the route (for example, current day of the week or current time of day, etc.), such that a route generated for travel during rush-hour may differ from a route generated for travel late at night. The routing controller 232 may also generate more than one navigation route to a destination and send more than one of these navigation routes to a user for selection by the user from among various possible routes.

In some scenarios, the vehicle on-board computing device 220 may determine perception information of the surrounding environment of the vehicle. Based on the sensor data provided by one or more sensors and location information that is obtained, the vehicle on-board computing device 220 may determine perception information of the surrounding environment of the vehicle. The perception information may represent what an ordinary driver would perceive in the surrounding environment of a vehicle. The perception data may include information relating to one or more objects in the environment of the vehicle. For example, the vehicle on-board computing device 220 may process sensor data (for example, lidar data, RADAR data, camera images, etc.) in order to identify objects and/or features in the environment of vehicle. The objects may include, but is not limited to, traffic signals, roadway boundaries, other vehicles, pedestrians, and/or obstacles. The vehicle on-board computing device 220 may use any now or hereafter known object recognition algorithms, video tracking algorithms, and computer vision algorithms (for example, track objects frame-to-frame iteratively over a number of time periods) to determine the perception.

In those or other scenarios, the vehicle on-board computing device 220 may also determine, for one or more identified objects in the environment, the current state of the object. The state information may include, without limitation, for each object: a current location; a current speed; an acceleration; a current heading; a current pose; a current shape, size and/or footprint; an object type or classification (for example, vehicle. pedestrian, bicycle, static object, or obstacle); and/or other state information.

The vehicle on-board computing device 220 may perform one or more prediction and/or forecasting operations. For example, the vehicle on-board computing device 220 may predict future locations, trajectories, and/or actions of one or more objects. For example, the vehicle on-board computing device 220 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the vehicle, the surrounding environment, and/or their relationship(s). For example, if an object is a vehicle and the current driving environment includes an intersection, the vehicle on-board computing device 220 may predict whether the object will likely move straight forward or make a turn. If the perception data indicates that the intersection has no traffic light, the vehicle on-board computing device 220 may also predict whether the vehicle may have to fully stop prior to entering the intersection.

In those or other scenarios, the vehicle on-board computing device 220 may determine a motion plan for the vehicle. For example, the vehicle on-board computing device 220 may determine a motion plan for the vehicle based on the perception data and/or the prediction data. Specifically, given predictions about the future locations of proximate objects and other perception data, the vehicle on-board computing device 220 can determine a motion plan for the vehicle that best navigates the vehicle relative to the objects at their future locations.

In those or other scenarios, the vehicle on-board computing device 220 may receive predictions and make a decision regarding how to handle objects and/or actors in the environment of the vehicle. For example, for a particular actor (for example, a vehicle with a given speed, direction, turning angle, etc.), the vehicle on-board computing device 220 decides whether to overtake, yield, stop, and/or pass based on, for example, traffic conditions, map data, state of the autonomous vehicle, etc. Furthermore, the vehicle on-board computing device 220 also plans a path for the vehicle to travel on a given route, as well as driving parameters (for example, distance, speed, and/or turning angle). That is, for a given object, the vehicle on-board computing device 220 decides what to do with the object and determines how to do it. For example, for a given object, the vehicle on-board computing device 220 may decide to pass the object and may determine whether to pass on the left side or right side of the object (including motion parameters such as speed). The vehicle on-board computing device 220 may also assess the risk of a collision between a detected object and the vehicle. If the risk exceeds an acceptable threshold, it may determine whether the collision can be avoided if the vehicle follows a defined vehicle trajectory and/or implements one or more dynamically generated emergency maneuvers in a pre-defined time period (for example, N milliseconds). If the collision can be avoided, then the vehicle on-board computing device 220 may execute one or more control instructions to perform a cautious maneuver (for example, mildly slow down, accelerate, change lane, or swerve). In contrast, if the collision cannot be avoided, then the vehicle on-board computing device 220 may execute one or more control instructions for execution of an emergency maneuver (for example, brake and/or change direction of travel).

As discussed above, planning and control data regarding the movement of the vehicle is generated for execution. The vehicle on-board computing device 220 may, for example: control braking via a brake controller; direction via a steering controller; speed and acceleration via a throttle controller (in a gas-powered vehicle) or a motor speed controller (such as a current level controller in an electric vehicle); change gears via a differential gear controller (in vehicles with transmissions); and/or control other operations via other controllers.

Figure 3:
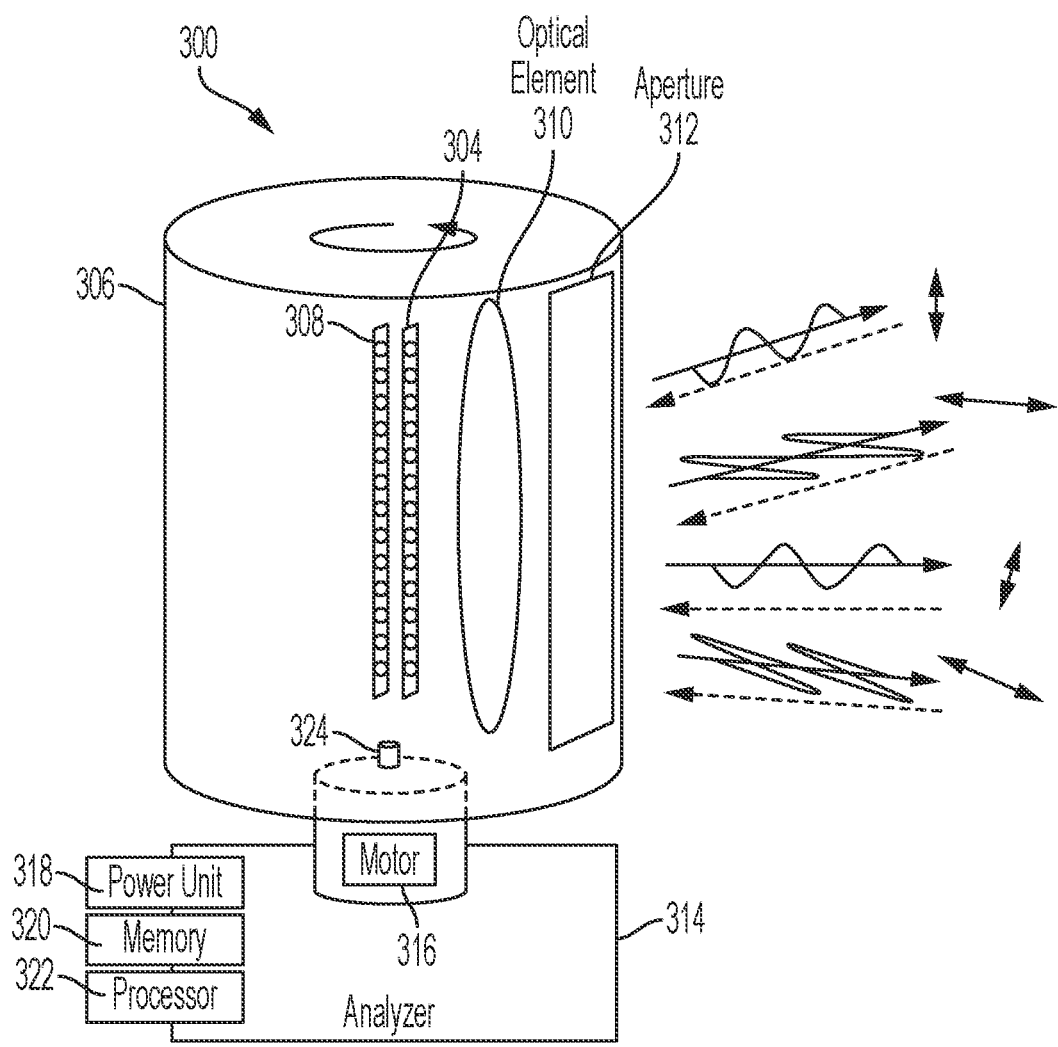
FIG. 3 is an illustration of an illustrative architecture for a light detection and ranging (lidar) system employed by the vehicle shown in FIG. 2.

FIG. 3 illustrates an architecture for a lidar system 300, in accordance with aspects of the disclosure. Lidar system 264 of FIG. 2 may be the same as or substantially similar to the lidar system 300. As such, the discussion of lidar system 300 is sufficient for understanding lidar system 264 of FIG. 2. It should be noted that the lidar system 300 of FIG. 3 is merely an example lidar system and that other lidar systems are further completed in accordance with aspects of the present disclosure, as should be understood by those of ordinary skill in the art.

As shown in FIG. 3, the lidar system 300 includes a housing 306 which may be rotatable 360° about a central axis such as hub or axle 324 of a motor 316. The housing may include an emitter/receiver aperture 312 made of a material transparent to light. Although a single aperture is shown in FIG. 3, the present solution is not limited in this regard. In other scenarios, multiple apertures for emitting and/or receiving light may be provided. Either way, the lidar system 300 can emit light through one or more of the aperture(s) 312 and receive reflected light back toward one or more of the aperture(s) 312 as the housing 306 rotates around the internal components. In alternative scenarios, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The emitter system 304 may include any number of individual emitters (for example, 8 emitters, 64 emitters, or 128 emitters). The emitters may emit light of substantially the same intensity or of varying intensities. The lidar system will also include a light detector 308 containing a photodetector or array of photodetectors positioned and configured to receive light reflected back into the system. The light emitter system 304 and light detector 308 would rotate with the rotating shell, or they would rotate inside the stationary dome of the housing 306. One or more optical element structures 310 may be positioned in front of the light emitting unit 304 and/or the light detector 308 to serve as one or more lenses or wave plates that focus and direct light that is passed through the optical element structure 310.

One or more optical element structures 310 may be positioned in front of a mirror (not shown) to focus and direct light that is passed through the optical element structure 310. As shown below, the system includes an optical element structure 310 positioned in front of the mirror and connected to the rotating elements of the system so that the optical element structure 310 rotates with the mirror. Alternatively or in addition, the optical element structure 310 may include multiple such structures (for example lenses and/or waveplates). Optionally, multiple optical element structures 310 may be arranged in an array on or integral with the shell portion of the housing 306.

The lidar system 300 will include a power unit 318 to power the light emitting unit 304, motor 316, and electronic components. The lidar system 300 also includes an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the lidar system 300 as shown, or some or all of it may be external to the lidar system and communicatively connected to the lidar system via a wired or wireless communication network or link.

Figure 4:
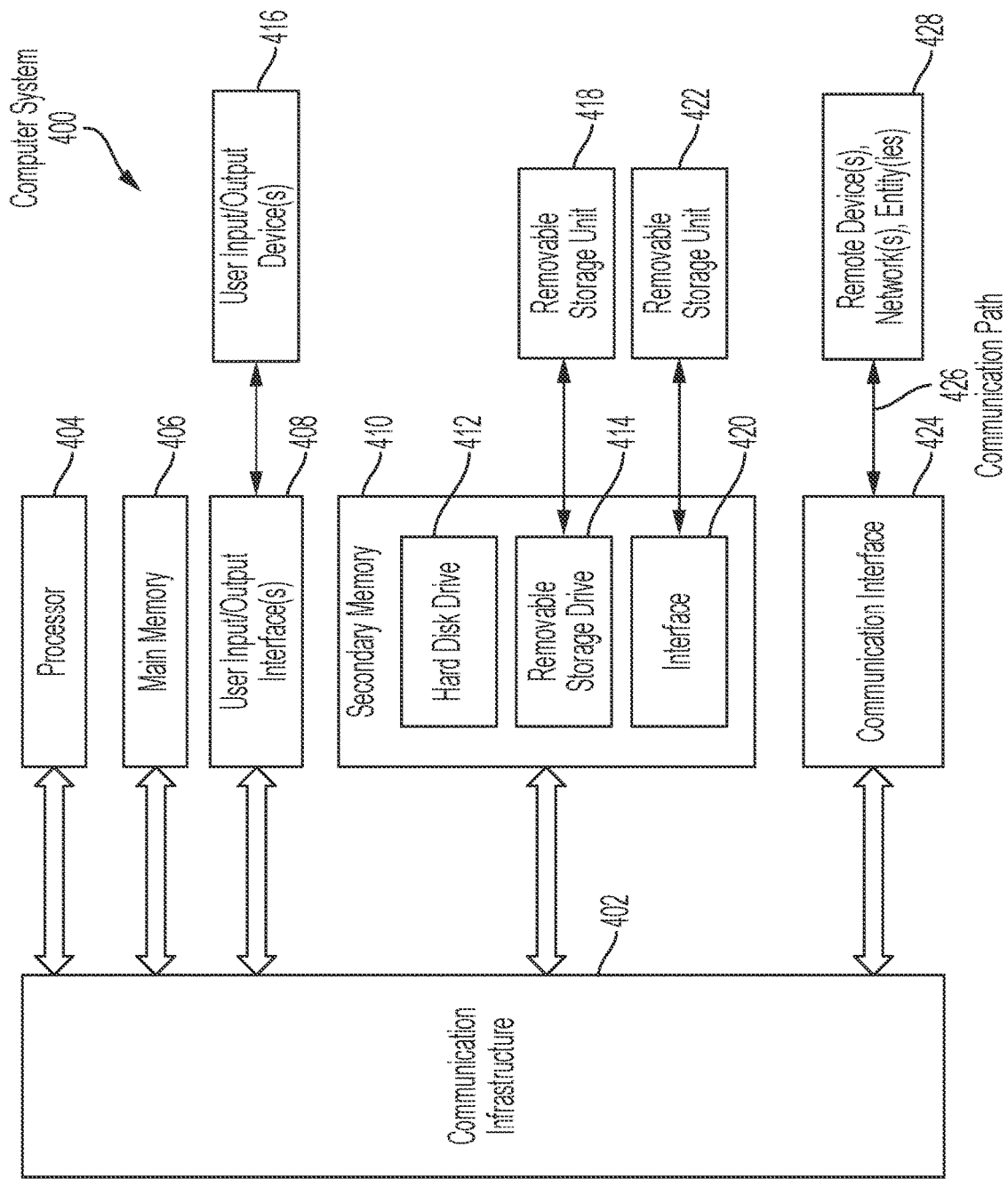
FIG. 4 is an illustration of an illustrative computing device.

The present solution can be implemented, for example, using one or more computer systems, such as computer system 400 shown in FIG. 4. Computer system 400 can be any computer capable of performing the functions described herein. The on-board computing device 122 of FIG. 1, computing device 110 of FIG. 1 and/or the vehicle on-board computing device 220 of FIG. 2 may be the same as or similar to computing system 400. As such, the discussion of computing system 400 is sufficient for understanding the devices 110, 122, 220 of FIGS. 1-2.

Computing system 400 may include more or less components than those shown in FIG. 4. However, the components shown are sufficient to disclose an illustrative solution implementing the present solution. The hardware architecture of FIG. 4 represents one implementation of a representative computing system configured to operate a vehicle, as described herein. As such, the computing system 400 of FIG. 4 implements at least a portion of the method(s) described herein.

Some or all components of the computing system 400 can be implemented as hardware, software and/or a combination of hardware and software. The hardware includes, but is not limited to, one or more electronic circuits. The electronic circuits can include, but are not limited to, passive components (for example, resistors and capacitors) and/or active components (for example, amplifiers and/or microprocessors). The passive and/or active components can be adapted to, arranged to and/or programmed to perform one or more of the methodologies, procedures, or functions described herein.

Computer system 400 includes one or more processors (also called central processing units, or CPUs), such as a processor 404. Processor 404 is connected to a communication infrastructure or bus 402. One or more processors 404 may each be a graphics processing unit (GPU). In some scenarios, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 416, such as monitors, keyboards, pointing devices, etc., that communicate with communication infrastructure 402 through user input/output interface(s) 408. Computer system 400 further includes a main or primary memory 406, such as random access memory (RAM). Main memory 406 may include one or more levels of cache. Main memory 406 has stored therein control logic (i.e., computer software) and/or data.

One or more secondary storage devices or memories 410 may be provided with computer system 400. Secondary memory 410 may include, for example, a hard disk drive 412 and/or a removable storage device or drive 414. Removable storage drive 414 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be an external hard drive, a universal serial bus (USB) drive, a memory card such as a compact flash card or secure digital memory, a floppy disk, a magnetic tape, a compact disc, a DVD, an optical storage disk, and/or any other computer data storage device. Removable storage drive 414 reads from and/or writes to removable storage unit 414 in a well-known manner.

In some scenarios, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In some scenarios, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 400, main memory 406, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use the present solution using data processing devices, computer systems and/or computer architectures other than that shown in FIG. 4. In particular, the present solution can operate with software, hardware, and/or operating system implementations other than those described herein.

Figure 5:
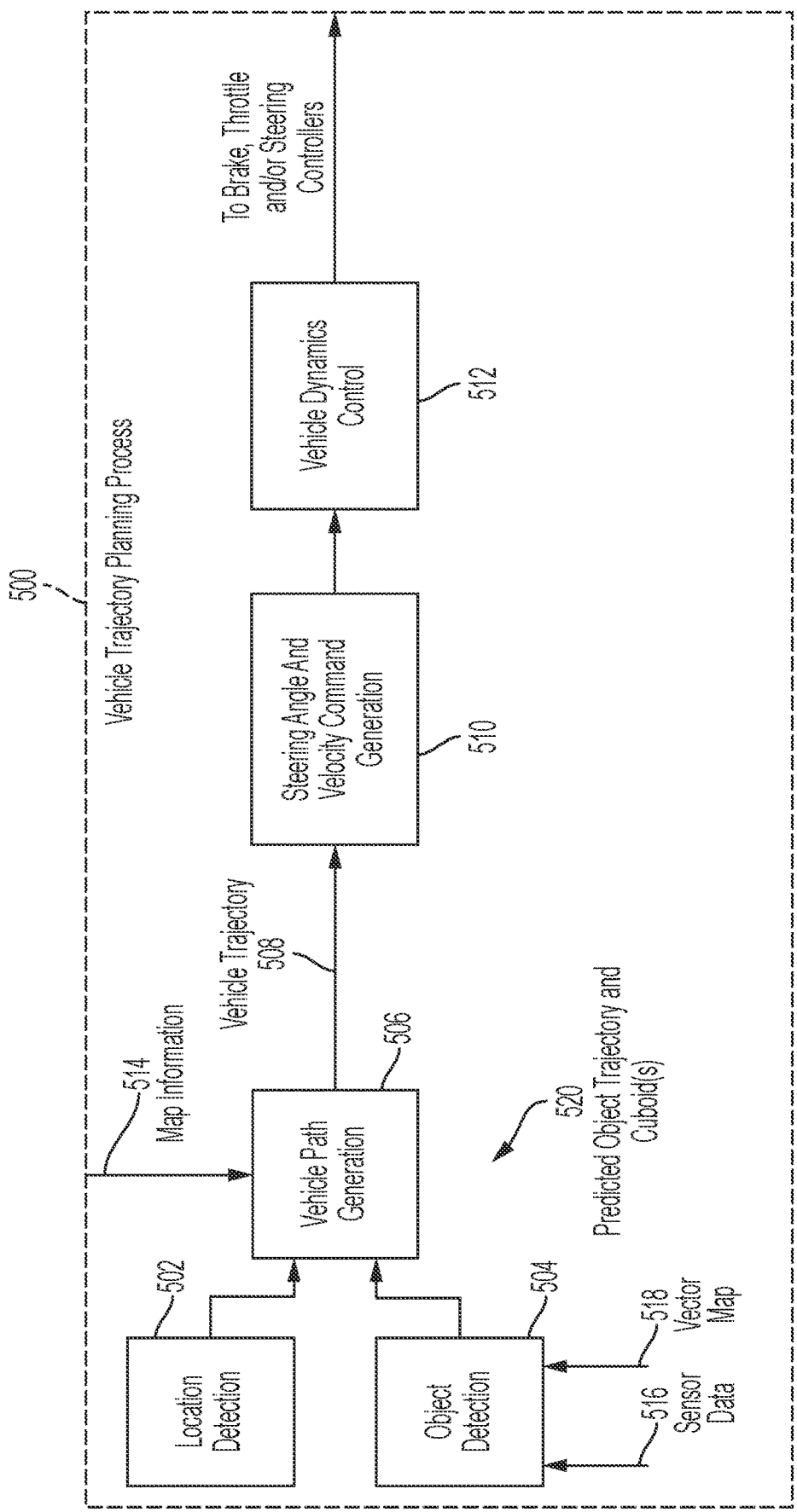
FIG. 5 provides a block diagram of an illustrative vehicle trajectory planning process.

Referring now to FIG. 5, there is provided a block diagram that is useful for understanding how movement of an AV is achieved in accordance with the present solution. All of the operations performed in blocks 502-512 can be performed by the on-board computing device (for example, on-board computing device 122 of FIGS. 1 and/or 220 of FIG. 1) of a vehicle (for example, AV 102 of FIG. 1).

In block 502, a location of the AV (for example, AV 102₁ of FIG. 1) is detected. This detection can be made based on sensor data output from a location sensor (for example, location sensor 260 of FIG. 2) of the AV. This sensor data can include, but is not limited to, GPS data. The detected location of the AV is then passed to block 506.

In block 504, an object (for example, vehicle 103 of FIG. 1) is detected within proximity of the AV (for example, <100+ meters). This detection is made based on sensor data output from a camera (for example, camera 262 of FIG. 2) of the AV and/or a lidar system (for example, lidar system 264 of FIG. 2) of the AV. For example, image processing is performed to detect an instance of an object of a certain class (for example, a vehicle, cyclist or pedestrian) in an image. The image processing/object detection can be achieved in accordance with any known or to be known image processing/object detection algorithm.

Additionally, a predicted trajectory is determined in block 504 for the object. The object's trajectory is predicted in block 504 based on the object's class, cuboid geometry(ies), cuboid heading(s) and/or contents of a map 518 (for example, sidewalk locations, lane locations, lane directions of travel, driving rules, etc.). The manner in which the cuboid geometry(ies) and heading(s) are determined will become evident as the discussion progresses. At this time, it should be noted that the cuboid geometry(ies) and/or heading(s) are determined using sensor data of various types (for example, 2D images, 3D lidar point clouds) and a vector map 518 (for example, lane geometries). Techniques for predicting object trajectories based on cuboid geometries and headings are well known in the art. One technique involves predicting that the object is moving on a linear path in the same direction as the heading direction of a cuboid. The predicted object trajectories can include, but are not limited to, the following trajectories: a trajectory defined by the object's actual speed (for example, 1 mile per hour) and actual direction of travel (for example, west); a trajectory defined by the object's actual speed (for example, 1 mile per hour) and another possible direction of travel (for example, south, south-west, or X (for example, 40°) degrees from the object's actual direction of travel in a direction towards the AV) for the object; a trajectory defined by another possible speed for the object (for example, 2-10 miles per hour) and the object's actual direction of travel (for example, west); and/or a trajectory defined by another possible speed for the object (for example, 2-10 miles per hour) and another possible direction of travel (for example, south, south-west, or X (for example, 40°) degrees from the object's actual direction of travel in a direction towards the AV) for the object. The possible speed(s) and/or possible direction(s) of travel may be pre-defined for objects in the same class and/or sub-class as the object. It should be noted once again that the cuboid defines a full extent of the object and a heading of the object. The heading defines a direction in which the object's front is pointed, and therefore provides an indication as to the actual and/or possible direction of travel for the object.

Information 520 specifying the object's predicted trajectory, the cuboid geometry(ies)/heading(s) is provided to block 506. In some scenarios, a classification of the object is also passed to block 506. In block 506, a vehicle trajectory is generated using the information from blocks 502 and 504. Techniques for determining a vehicle trajectory using a cuboids are well known in the art. For example, in some scenarios, such a technique involves determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. The vehicle trajectory 520 can be determined based on the location information from block 502, the object detection information from block 504, and/or map information 514 (which is pre-stored in a data store of the vehicle). The vehicle trajectory 520 may represent a smooth path that does not have abrupt changes that would otherwise provide passenger discomfort. For example, the vehicle trajectory is defined by a path of travel along a given lane of a road in which the object is not predicted travel within a given amount of time. The vehicle trajectory 520 is then provided to block 508.

In block 508, a steering angle and velocity command is generated based on the vehicle trajectory 520. The steering angle and velocity command are provided to block 510 for vehicle dynamics control, i.e., the steering angle and velocity command causes the AV to follow the vehicle trajectory 508.

Figure 6:
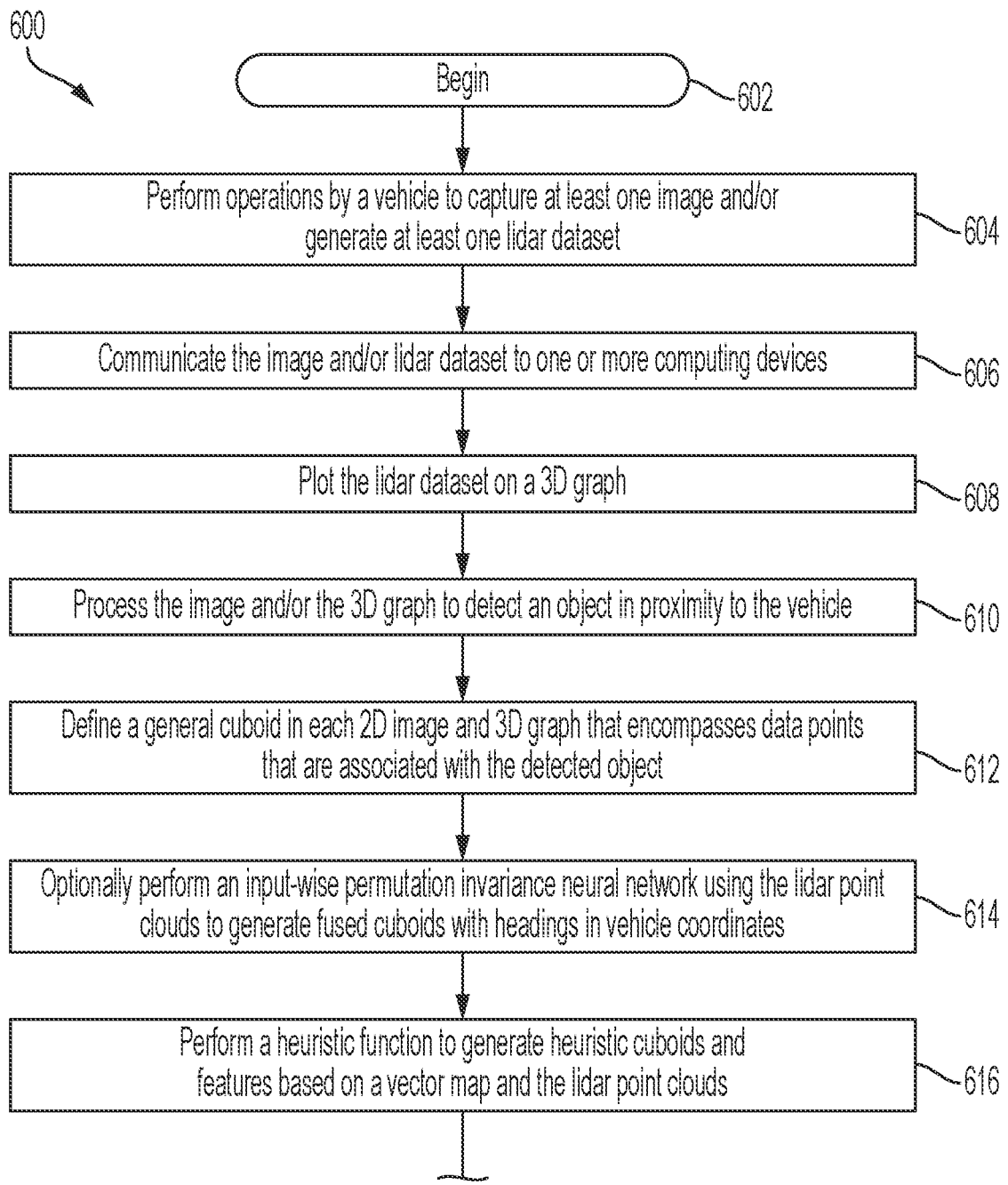
FIG. 6 provides a flow diagram of an illustrative method for operating a vehicle.
Figure 6:
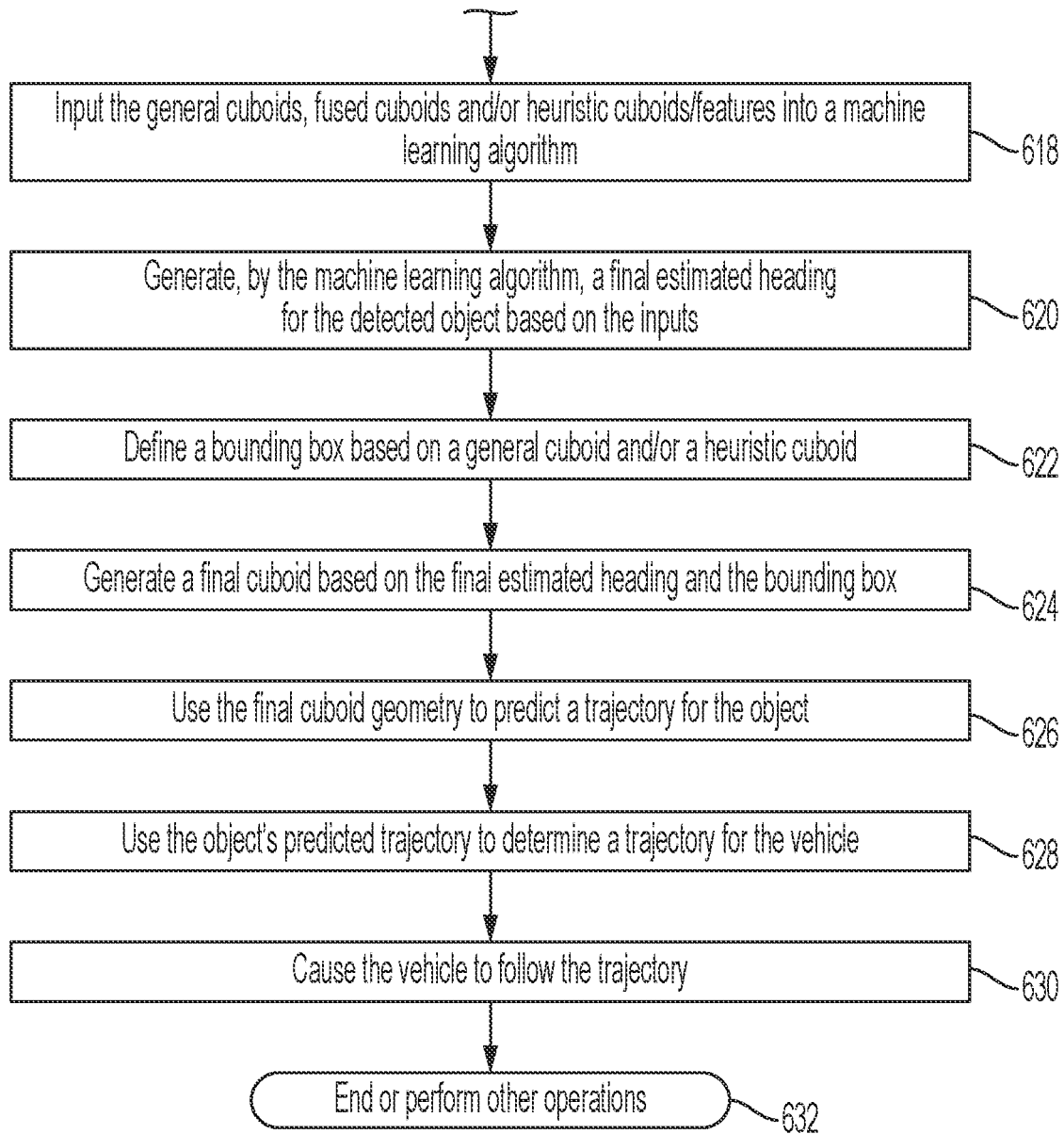

Referring now to FIG. 6, there is provided a flow diagram of an illustrative method 600 for operating a vehicle. Method 600 begins with 602 and continues with 604 where a vehicle (for example, AV 102 of FIG. 1) performs operations to capture at least one image and/or generate at least one lidar dataset. The image and/or lidar dataset are communicated in 606 to one or more computing devices (for example, on-board computing device 122 of FIG. 1, remote computing device 110 of FIG. 1 and/or vehicle on-board computing device 220 of FIG. 2).

At the computing device(s), the lidar dataset is plotted on a 3D graph as shown by 608. The 3D graph has an x-axis, a y-axis and a z-axis. An illustration of a lidar dataset 702 plotted on a graph 700 is provided in FIG. 7. Notably, graph 700 only shows the 2D point of view from the x-axis and the y-axis for ease of illustration. Technique for plotting lidar datasets on 3D graphs are well known.

The image and/or 3D graph are used in 610 to detect an object that is located in proximity to the vehicle. General cuboid(s) is(are) defined in 612 in the image and/or on the 3D graph. A general cuboid defined in an image is referred to herein as a monocular cuboid, and a general cuboid defined on the 3D graph is referred to herein as a Deep lidar cuboid. Each general cuboid is a 3D oriented bounded box that represents (i) a heading of the object (for example, object 102₂ of FIG. 1) in vehicle coordinates and (ii) the full extent of the object (for example, object 102₂ of FIG. 1). In this regard, the monocular cuboid encompasses pixels in the image that are associated with the detected object, and the Deep lidar cuboid encompasses the lidar data points in the 3D graph that are associated with the detected object.

Figure 7:
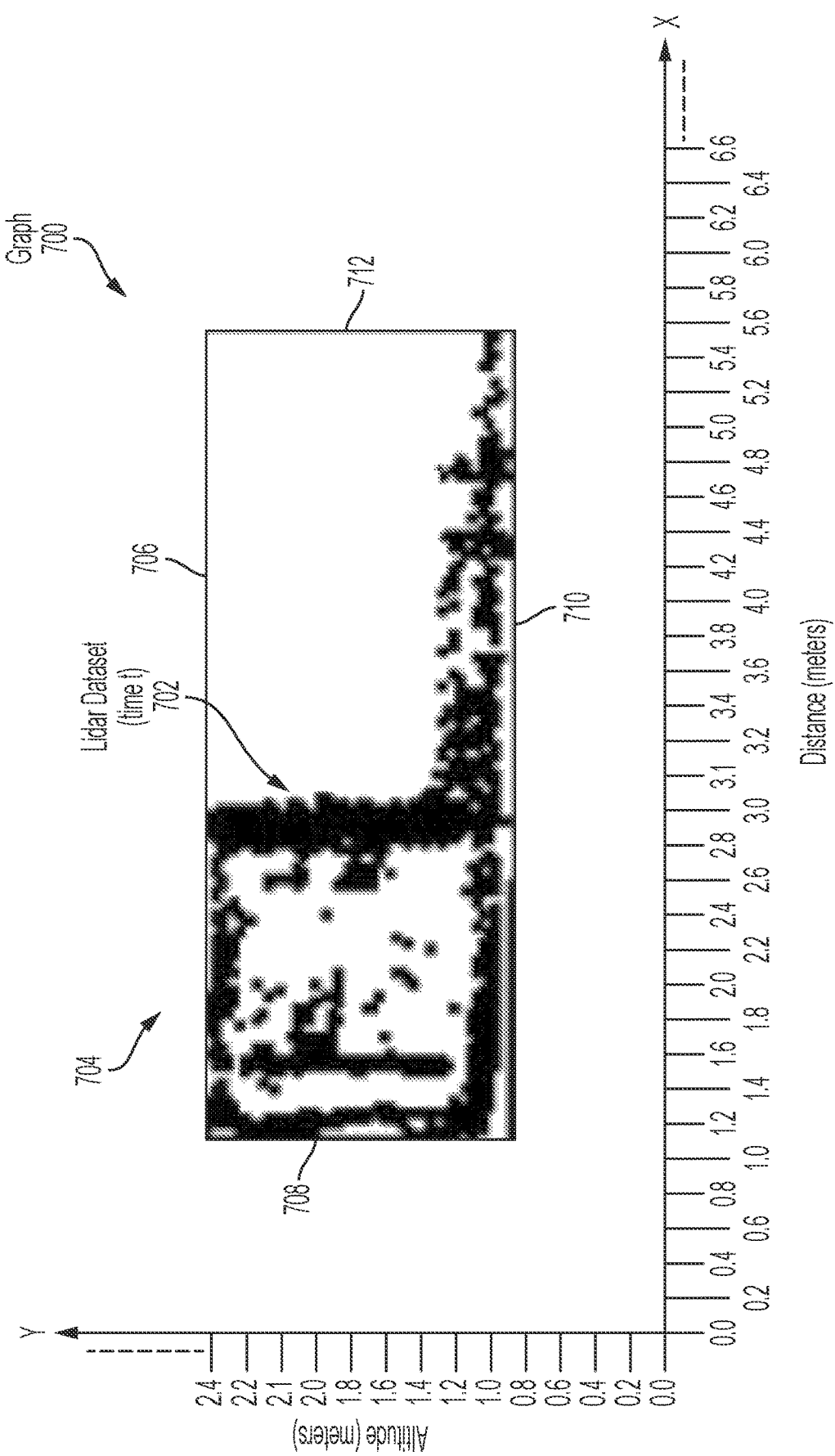
FIG. 7 provides a graph including a lidar dataset and a cuboid.

An illustration showing an illustrative general Deep lidar cuboid 704 defined on a graph 700 is provided in FIG. 7. As shown in FIG. 7, all of the data points of a lidar dataset 702 reside within the cuboid 704. Notably, one or more of the edges 706-712 of the cuboid may touch or otherwise are in contact with the data points of the lidar dataset 702. The present solution is not limited to the particulars of this illustration. Generally, the cuboid 704 is constructed by: fusing the lidar dataset, a vector map and a visual heading; and defining a cuboid along the heading with a highest likelihood. The vector map contains the lane direction which provides a strong indication for a heading of the cuboid. The visual heading is estimated for the object from the camera images. The present solution is not limited to the particulars of FIG. 7.

In 614, an input-wise permutation invariance neural network can optionally be performed to generate fused cuboids using the lidar point cloud(s). The input-wise permutation invariance neural network can include, but is not limited to, a PointNet. The fused cuboids have a heading in vehicle coordinates.

In 616, a heuristic function is performed to generate heuristic cuboid(s) and features based on a vector map (for example, lane geometries) and the lidar point cloud(s). Heuristic functions of this type are well known. The heuristic cuboid(s) has(have) heading(s) in vehicle coordinates.

In 618, the general cuboid(s), fused cuboid(s) and/or heuristic cuboid(s) are input into a machine learning algorithm. The machine learning algorithm can include, but is not limited to, a Random Forest (RF) classifier, a gradient boosting classifier, a support vector machine, support vector regression classifier, and/or a Multi-Layer Perception (MLP) network. Each of the listed machine learning algorithms is well known. The machine learning algorithm and/or model is trained to generate a final estimated cuboid heading for the detected object based on cuboids generated using different types of datasets (i.e., monocular camera datasets and lidar datasets).

In some scenarios, the machine learning algorithm and/or model is(are) trained by Euclidean regression, classification and/or offset prediction. The classification can involve: discretizing the range (for example, 0, 360) in N classes or bins of one degree each; and using a Gini loss function for RF classification. The offset prediction can involve: computing an offset representing a difference between a heading angle for a detected object and a RF classification; and computing a Gini loss on the offset. The offset is computed using the heading associated with the heuristic cuboid when available for the detected object. If the heuristic cuboid is not available for the detected object, then the heading associated with the Deep lidar cuboid is used to compute the offset. The present solution is not limited to the particulars of the machine learning training process.

The machine learning algorithm generates a final estimated heading for the object based on the inputs, as shown by 620. In this way, the machine learning algorithm resolves scenarios where two or more of the input cuboids have different or conflicting headings.

A bounding box is defined in 622 based on a general cuboid (for example, a Deep lidar cuboid) and/or a heuristic cuboid. For example, the bounding box is defined by: selecting a Deeplidar cuboid when available for a detected object; selecting a heuristic cuboid when the Deeplidar cuboid is not available for the detected object; and using the cuboid geometry of the selected Deeplidar or heuristic cuboid to define a bounding box size and location. A final cuboid is generated in 624 using the bounding box and final estimated heading.

Next in 626-630, the final cuboid is used to facilitate driving-related operations of the vehicle (for example, object tracking, object trajectory prediction, and/or vehicle trajectory determination). More specifically in 626, the final cuboid's geometry is used to predict a trajectory for the object. Techniques for predicting object trajectories based on cuboid geometries are well known in the art. For example, one technique involves predicting that the object is moving on a linear path in the same direction as the heading direction of the cuboid. The present solution is not limited to the particulars of this example.

In 628, a trajectory for the vehicle is generated using the final cuboid's geometry and the predicted object's trajectory. Techniques for determining a vehicle trajectory using a cuboid are well known in the art. For example, in some scenarios, such a technique involves determining a trajectory for the vehicle that would pass the object when the object is in front of the vehicle, the cuboid has a heading direction that is aligned with the direction in which the vehicle is moving, and the cuboid has a length that is greater than a threshold value. The present solution is not limited to the particulars of this example. The vehicle is then caused to follow the trajectory, as shown by 630. In effect, the final cuboid can also be said to facilitate the control of autonomous driving operations of the vehicle. Subsequently, 632 is performed where method 600 ends or other operations are performed.

Figure 8:
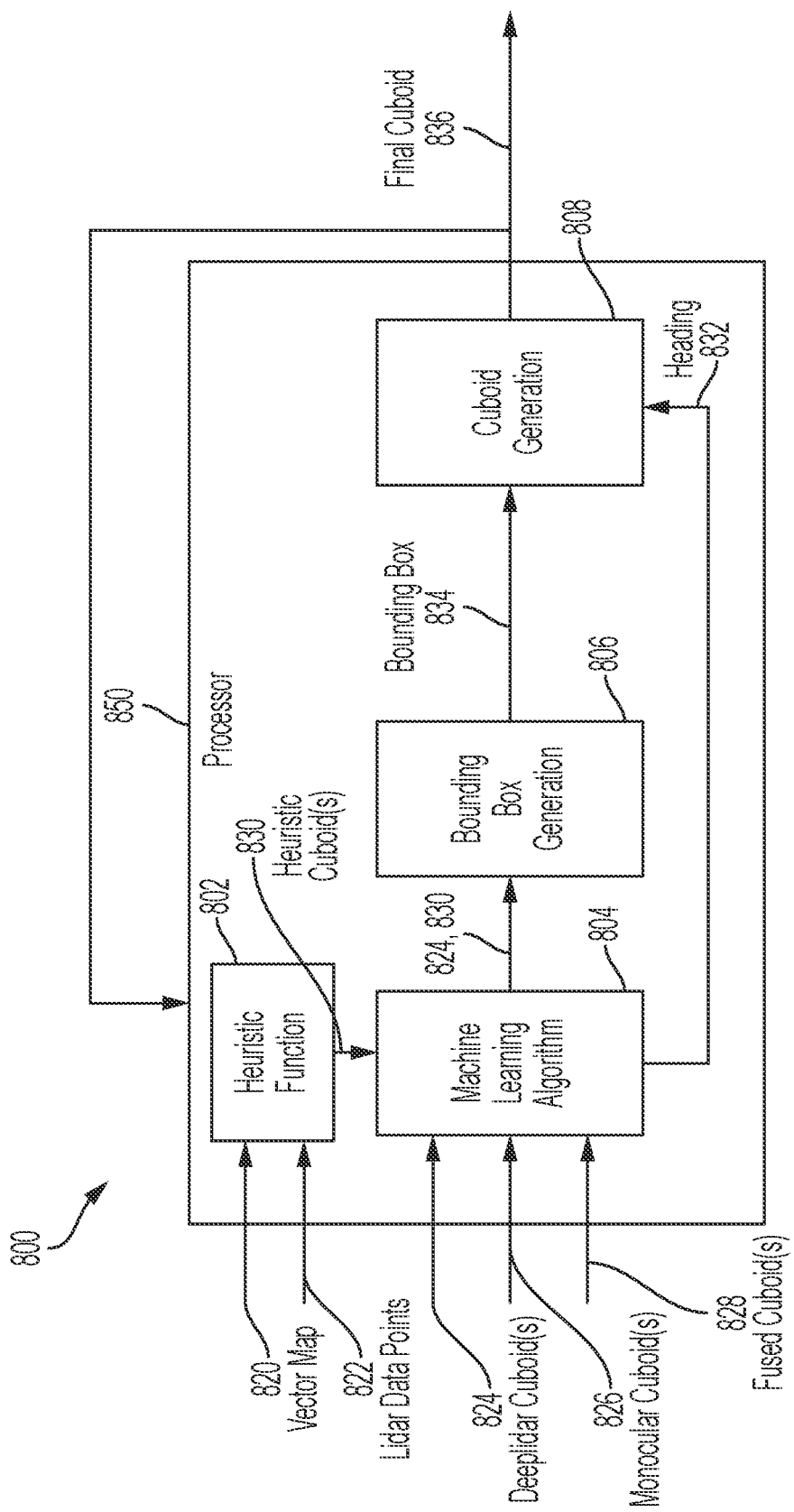
FIG. 8 provides a block diagram of an illustrative circuit that is useful for understanding how a final cuboid is generated in accordance with the present solution.

Referring now to FIG. 8, there is provided a block diagram of an illustrative circuit 800 implementing the present solution. Circuit 800 is generally configured to generate a final cuboid based on data from a plurality of sources such as monocular camera(s), lidar system(s) and/or vector map(s). Circuit 800 can be implemented by a processor 850 as shown in FIG. 8. The circuit 800 can also include a memory and programming instructions that are configured to cause a processor to perform the operation described below. The present solution is not limited in this regard. Circuit 800 can be implemented via other electronic means such as logic components (for example, adders, subtractors, etc.), passive components (for example, resistors, capacitors, etc.) and/or active components (for example, selectors, switches, etc.).

As shown in FIG. 8, various information is input into the processor 850. This information includes, but is not limited to, a vector map 820, lidar data points 822, Deeplidar cuboid(s) 824, monocular cuboid(s) 826 and/or fused cuboid(s) 828 (e.g., from other sources). Techniques for generating Deeplidar cuboid(s) using lidar datasets are well known. Techniques for generating monocular cuboid(s) using images are also well known, as well as techniques for generating fused cuboid(s) (for example, PointNet cuboids).

The vector map 820 and lidar data points 822 are used in block 802 to generate heuristic cuboid. Heuristic functions of this type are well known. The heuristic cuboid(s) 830 are passed to block 804.

In block 804, a machine learning algorithm is performed to resolve any cuboid heading inaccuracies and/or differences associated with Deeplidar cuboid(s) 824, monocular cuboid(s) 826, fused cuboid(s) 828 and/or heuristic cuboid(s) 830. The machine learning algorithm can include, but is not limited to, an RF classifier, a gradient boosting classifier, a support vector machine, a support vector regression classifier, and/or an MLP network. Each of the listed machine learning algorithms is well known. The machine learning algorithm and/or model is(are) trained to generate a final estimated cuboid heading for the detected object based on cuboids generated using different types of datasets (i.e., monocular camera datasets and lidar datasets).

During operation, the machine learning algorithm is provided with a plurality of features as inputs. These features are determined in block 804 based on the inputted cuboids 824, 826, 828, 830. The features include, but are not limited to, cuboid headings from different sources (for example, a monocular cuboid heading, a Deeplidar cuboid heading, a heuristic cuboid heading and/or a fused cuboid heading), a variance for a monocular cuboid heading, a variance for a heuristic cuboid heading, a variance for a fused cuboid heading, a variance for a Deeplidar cuboid, a value indicating an availability of a heading variance associated with a monocular cuboid, a value indicating an availability of a heading variance associated with a Deeplidar cuboid, a value indicating an availability of a heading variance associated with a heuristic cuboid, a value indicating an availability of a heading variance associated with a fused cuboid, a distance from the vehicle to the monocular cuboid, a distance from the vehicle to the Deeplidar cuboid, a distance from the vehicle to the heuristic cuboid, a distance from the vehicle to the fused cuboid, a number of lidar data points in a Deeplidar or heuristic cuboid (which provides an indication of occlusion), a number of points in a monocular cuboid, a speed of an object, a course of the object, top three lane directions, a value indicating whether the object is in any driving lane(s), a distance from the object to a driving lane (which would be zero if the object is in a lane), an area of the heuristic cuboid's geometry, a long side length of the object based on the heuristic cuboid's geometry, a short side length of the object based on the heuristic cuboid's geometry, and/or a maximum height of the object from a ground surface. The listed features may be constructed based on the following information for heuristic cuboids: cuboids including headings in vehicle coordinates; lidar point clouds; lane geometries. The listed features may be constructed based on the following information for Deeplidar cuboids: cuboids including headings in vehicle coordinates; confidence scores; and number of lidar data points in each cuboid. The listed features may be constructed based on the following information for monocular cuboids: cuboids with headings in vehicle coordinates; and covariances.

The heading variance for a Deeplidar cuboid can be set equal to or derived from a confidence score for the Deeplidar cuboid. For example, in some scenarios, the system can access a Look Up Table (LUT) which maps confidence scores to heading variance values. The present solution is not limited to the particulars of this example.

In some scenarios, Deeplidar cuboids and/or heuristic cuboids may not be available for the object. When this occurs, special value(s) is(are) used as heading feature input(s) to the machine learning algorithm. The special value(s) is(are) pre-defined and stored in a datastore (for example, memory 406 and/or 410 of FIG. 4) that is accessible to the processor 850.

A special value may also be used for the number of lidar data points when both the Deeplidar cuboid and the heuristic cuboid are not available for the object. In contrast, when both the Deeplidar cuboid and the heuristic cuboid are not available, then the larger of (i) the number of lidar data points in the Deeplidar cuboid and (ii) the number of lidar points in the heuristic cuboid is used as the input to the machine learning algorithm. Special values may also be used for the object's course when the same is not available and/or a lane direction when less than a given amount (for example, three) are available.

The above-listed features are used by the machine learning algorithm in block 804 to determine a final estimate heading 832 for the detected object. The final estimate heading is passed to block 808 for subsequent use in generating a final cuboid 836. The geometry for the final cuboid 834 is determined based on a bounding box 834 generated in block 806.

In block 806, the following operations are performed: selecting the Deeplidar cuboid 824 when available for the object; selecting the heuristic cuboid 830 when the Deeplidar cuboid 824 is not available for the object; using the geometry of the selected cuboid to define a size and location for a bounding box; and passing the bounding box information 834 to block 808.

At block 808, heading 832 and bounding box geometry are combined in block 808 to generate the final cuboid 836. An Extended Kalman Filter (EKF) may also be used in bock 808 to facilitate the generation of the final cuboid 836. EKFs are well known. The EKF generally acts as a temporal smoother for removing any relatively large instantaneous noise from outputs of the machine learning algorithm.

Figure 9:
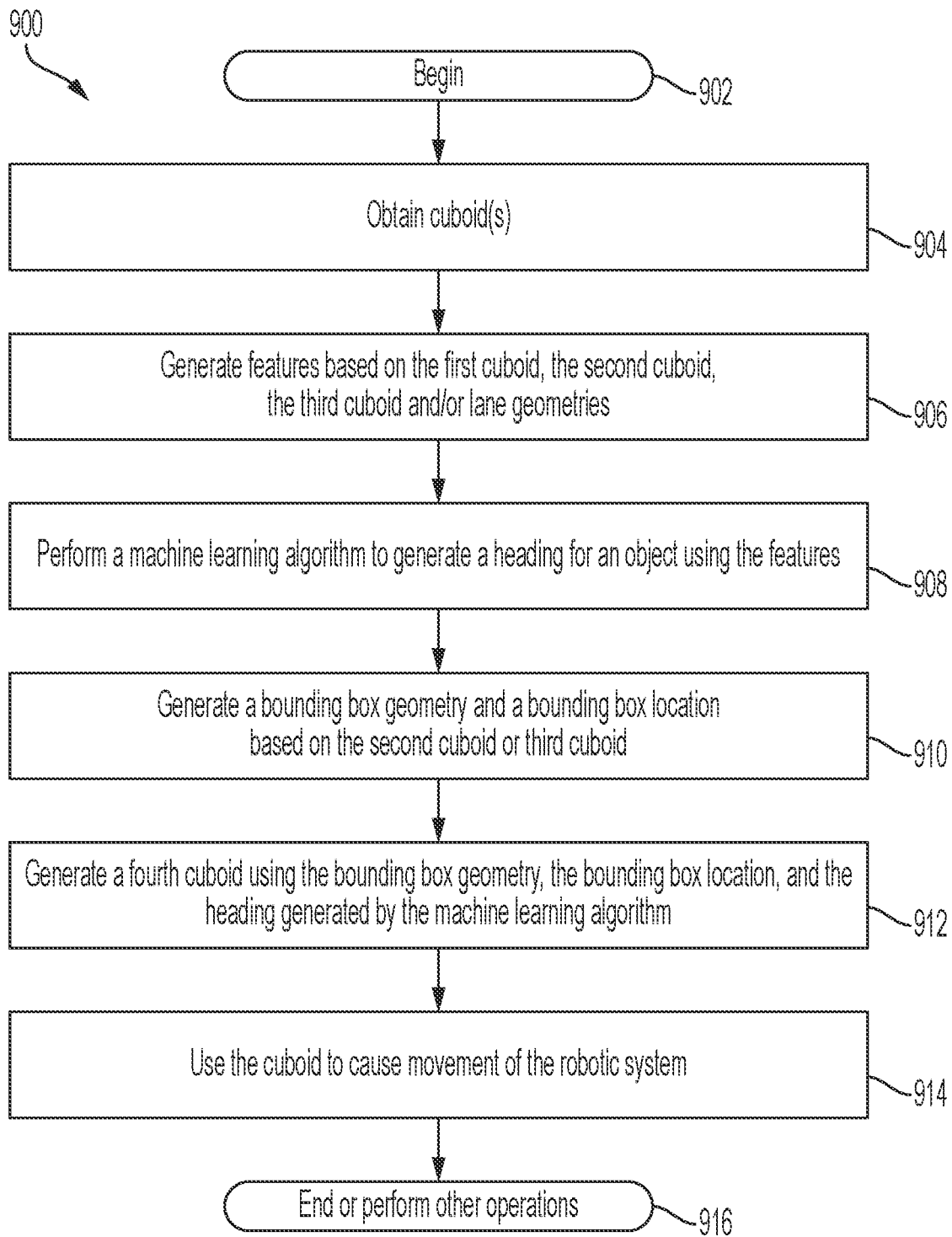
FIG. 9 provides a flow diagram of a method for operating a robotic system.

Referring now to FIG. 9, there is provided a flow diagram of an illustrative method 900 for generating cuboid(s) and/or operating robotic system(s) in accordance with the present solution. Method 900 begins with 902 and continues with 904 where a computing device (for example, on-board computing device 122 of FIG. 1, vehicle on-board computing device 220 of FIG. 2 computing device 400 of FIG. 4, and/or processor 850 of FIG. 8) obtains a first cuboid (for example, monocular cuboid 826 of FIG. 7) generated based on an image, a second cuboid (for example, Deeplidar cuboid 826 of FIG. 8) generated based on a lidar dataset (for example, lidar dataset 702 of FIG. 7) and/or a third cuboid (for example, heuristic cuboid 830 of FIG. 8) generated by a heuristic algorithm using the lidar dataset.

In 906, the cuboid(s) and/or lane geometries is(are) used to generate features that are to be used as inputs to a machine learning algorithm. The features can include, but are not limited to, a first heading of the first cuboid, a second heading of the second cuboid, a third heading of the third cuboid, a variance for the first heading, a variance for the second heading, a variance for the third heading, a value indicating an availability of a heading and a heading variance associated with the first cuboid, a value indicating an availability of a heading and a heading variance associated with the second cuboid, and a value indicating an availability of a heading and a heading variance associated with the third cuboid, a distance from the robotic system to the first cuboid, a distance from the robotic system to the second cuboid, a distance from the robotic system to the third cuboid, a number of points in the second cuboid or third cuboid, a course of the object, a plurality of lane directions, a value indicating whether the object is in a driving lane, a distance from the object to a driving lane, an area of the object based on a geometry of the third cuboid, a long side length of the object based on the geometry of the third cuboid, a short side length of the object based on the geometry of the third cuboid, and/or a maximum height of the object from a ground surface. The features are input to and used by the machine learning algorithm to generate a heading for an object (for example, vehicle 103 of FIG. 1) in proximity to the robotic system. The machine learning algorithm can include, but is not limited to, an RF algorithm.

In 910, the computing device performs operations to generate a bounding box geometry and a bounding box location based on the second cuboid (for example, the Deeplidar cuboid) or the third cuboid (for example, the heuristic cuboid). The bounding box geometry and the bounding box location may be generated by: selecting the second cuboid when available for the object; selecting the third cuboid when the second cuboid is not available for the object; and using a geometry of the second or third cuboid which was selected to define a size and location for a bounding box.

In 912, a fourth cuboid (for example, final cuboid 836 of FIG. 8) is generated using the bounding box geometry, the bounding box location and the heading generated by the machine learning algorithm. More specifically, the fourth cuboid's geometry is set equal to the bounding box geometer, the fourth's cuboid's location is set to the bounding box location and the fourth cuboid's heading is set to the heading generated by the machine learning algorithm. The fourth cuboid is then used in 914 to cause movement of the robotic system. For example, the fourth cuboid is used to generate a trajectory for the object, which is used to determine a trajectory for the robotic system (for example, a vehicle) or a movable component (for example, an articulating arm) of the robotic system. The robotic system or movable component is then caused to follow the trajectory. Subsequently, 916 is performed where method 900 ends or other operations are performed.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for operating a robotic system, comprising:
obtaining, by a computing device, at least two of a first cuboid generated based on an image, a second cuboid generated based on a lidar dataset, and a third cuboid generated by a heuristic algorithm using the lidar dataset;
using, by the computing device, a machine learning model to generate a heading for an object in proximity to the robotic system based on at least two of the first cuboid, second cuboid and third cuboid;
generating, by the computing device, a bounding box geometry and a bounding box location based on the second cuboid or third cuboid; and
generating, by the computing device, a fourth cuboid using the bounding box geometry, the bounding box location, and the heading generated using the machine learning model; and
using, by the computing device, the fourth cuboid to cause movement of the robotic system.

2. The method according to claim 1, further comprising generating a plurality of features for input into a machine learning algorithm based on at least two of the first cuboid, the second cuboid, the third cuboid and lane geometries.

3. The method according to claim 2, wherein the plurality of features comprise a first heading of the first cuboid, a second heading of the second cuboid, and a third heading of the third cuboid.

4. The method according to claim 3, wherein the plurality of features further comprise a variance for the first heading, a variance for the second heading, and a variance for the third heading.

5. The method according to claim 4, wherein the plurality of features further comprise a value indicating an availability of a heading and a heading variance associated with the first cuboid, a value indicating an availability of a heading and a heading variance associated with the second cuboid, and a value indicating an availability of a heading and a heading variance associated with the third cuboid.

6. The method according to claim 2, wherein the plurality of features comprise a distance from the robotic system to the first cuboid, a distance from the robotic system to the second cuboid, and a distance from the robotic system to the third cuboid.

7. The method according to claim 2, wherein the plurality of features comprise a number of points in the second cuboid or third cuboid.

8. The method according to claim 2, wherein the plurality of features comprise at least one of a course of the object, a plurality of lane directions, a value indicating whether the object is in a driving lane, a distance from the object to a driving lane, an area of the object based on a geometry of the third cuboid, a long side length of the object based on the geometry of the third cuboid, a short side length of the object based on the geometry of the third cuboid, and a maximum height of the object from a ground surface.

9. The method according to claim 1, wherein the bounding box geometry and the bounding box location are generated by: selecting the second cuboid when available for the object; selecting the third cuboid when the second cuboid is not available for the object; and using a geometry of the second or third cuboid which was selected to define a size and location for a bounding box.

10. A system, comprising:
a processor;
a non-transitory computer-readable storage medium comprising programming instructions that are configured to cause the processor to implement a method for operating a robotic system, wherein the programming instructions comprise instructions to:

obtain at least two of a first cuboid generated based on an image, a second cuboid generated based on a lidar dataset, and a third cuboid generated by a heuristic algorithm using the lidar dataset;

using a machine learning model to generate a heading for an object in proximity to the robotic system based on at least two of the first cuboid, second cuboid and third cuboid;

generate a bounding box geometry and a bounding box location based on the second cuboid or third cuboid; and generate a fourth cuboid using the bounding box geometry, the bounding box location, and the heading generated using the machine learning model; and use the fourth cuboid to cause movement of the robotic system.

11. The system according to claim 10, wherein the programming instructions further comprise instructions to generate a plurality of features for input into a machine learning algorithm based on at least two of the first cuboid, the second cuboid, the third cuboid and lane geometries.

12. The system according to claim 11, wherein the plurality of features comprise a first heading of the first cuboid, a second heading of the second cuboid, and a third heading of the third cuboid.

13. The system according to claim 12, wherein the plurality of features further comprise a variance for the first heading, a variance for the second heading, and a variance for the third heading.

14. The system according to claim 13, wherein the plurality of features further comprise a value indicating an availability of a heading and a heading variance associated with the first cuboid, a value indicating an availability of a heading and a heading variance associated with the second cuboid, and a value indicating an availability of a heading and a heading variance associated with the third cuboid.

15. The system according to claim 11, wherein the plurality of features comprise a distance from the robotic system to the first cuboid, a distance from the robotic system to the second cuboid, and a distance from the robotic system to the third cuboid.

16. The system according to claim 11, wherein the plurality of features comprise a number of points in the second cuboid or third cuboid.

17. The system according to claim 11, wherein the plurality of features comprise at least one of a course of the object, a plurality of lane directions, a value indicating whether the object is in a driving lane, a distance from the object to a driving lane, an area of the object based on a geometry of the third cuboid, a long side length of the object based on the geometry of the third cuboid, a short side length of the object based on the geometry of the third cuboid, and a maximum height of the object from a ground surface.

18. A non-transitory computer-readable medium having instructions stored thereon that, when executed by at least one computing device, cause the at least one computing device to perform operations comprising:

obtaining at least two of a first cuboid generated based on an image, a second cuboid generated based on a lidar dataset, and a third cuboid generated by a heuristic algorithm using the lidar dataset;

using a machine learning model to generate a heading for an object in proximity to the robotic system based on at least two of the first cuboid, second cuboid and third cuboid;

generating a bounding box geometry and a bounding box location based on the second cuboid or third cuboid;

generating a fourth cuboid using the bounding box geometry, the bounding box location, and the heading generated using the machine learning model; and using the fourth cuboid to cause movement of the robotic system.

\* \* \* \* \*